Figure 1:
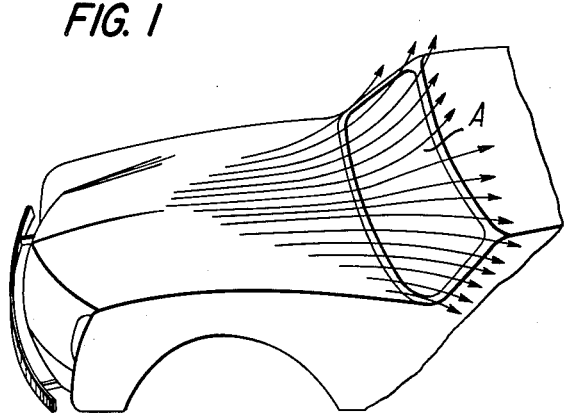

June 5, 1962  L. PÉRAS ETAL  3,037,233
WINDSCREEN WIPERS
Filed July 30, 1957  2 Sheets-Sheet 1

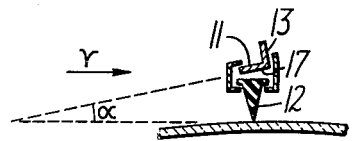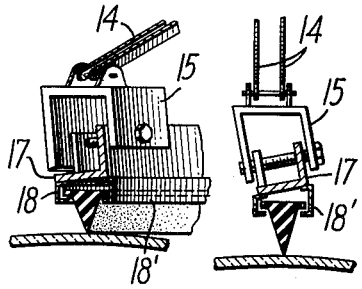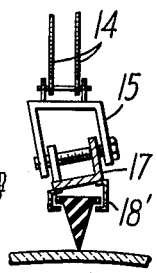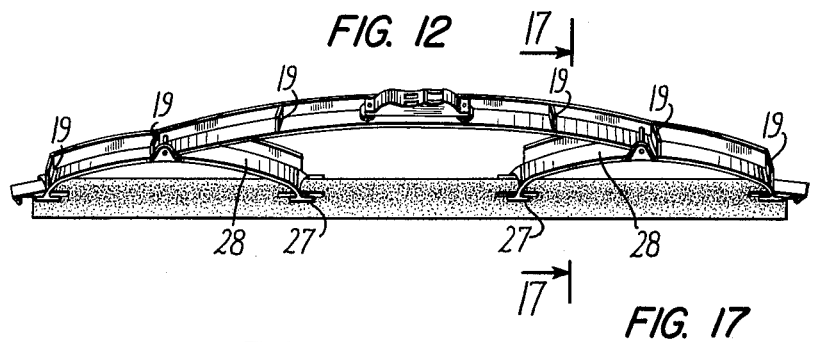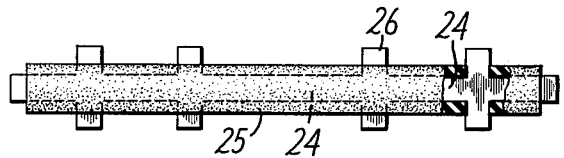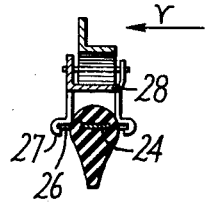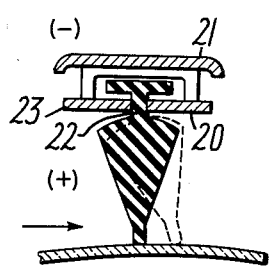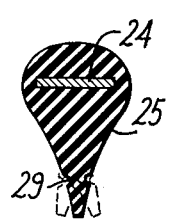

United States Patent Office 3,037,233
Patented June 5, 1962

3,037,233
WINDSCREEN WIPERS
Lucien Péras, Billancourt, and Marcel Suisse, Paris, France; said Péras assignor to Regie Nationale des Usines Renault, Billancourt, France
Filed July 30, 1957, Ser. No. 675,229
Claims priority, application France Apr. 27, 1957
14 Claims. (Cl. 15—250.42)

The present invention relates to improvements in windscreen wipers, especially those intended for fast vehicles such as automobile vehicles or automotive rail coaches, and it relates more particularly to means for preventing the windscreen wiper arm from lifting away from the glass at high speeds.

It has in fact been found that on curved or cambered windscreens with which automobiles are now fitted, the wipers actually employed, which are generally formed by a frame with a U-profile turned towards the glass and with a wiper reinforced by a flexor when so required, are sometimes subjected at high speeds to a lifting effect which prevents a correct wiping action of the glass from being obtained. The phenomenon will easily be understood when considering the aerodynamic action which takes place. The action which plays an essential part is that of the streams of air passing around the vehicle, which, in the axis of the vehicle and with a curved windscreen, tend to escape vertically upwards, but which, nearer the sides of the windscreen, tend to pass horizontally round the sides. These streams of air create, mainly in the zones in which the wiper meets them perpendicularly, a reduced pressure above the wiper and an increase of pressure between the glass and the wiper, this increase in pressure being further increased by the U-shape of the frame and its orientation towards the windscreen, and the resulting pressure, in spite of the mechanical pressure applied by the arm of the wiper, causes the latter to lift away towards the front of the glass and prevents correct operation being obtained.

The invention has for its object a windscreen wiper which enables this drawback to be overcome, which is especially remarkable in that its support or frame, that is to say the part of the wiper which is coupled to the oscillating arm and intended to receive the blade which may or may not have a reinforcing flexor, the frame being formed by a single element or elements articulated to each other and having a profile such that it causes an increase in pressure above and a reduced pressure beneath the wiper, so as to press the latter against the windscreen. The profile has preferably a convex face directed towards the wiper and a concave or flat face towards the front, or again it may comprise a flange directed towards the front. The section may in particular have the form of a U, a V, an L or the form of an aircraft wing reversed.

In accordance with one particular form of the invention, the frame is arranged so as to have a negative incidence, that is to say it is inclined towards the windscreen in the direction of flow of the tangential stream of air.

A further improvement consists in providing the rubber wiper with a widened profile which prevents the wiper from leaning sideways under the effect of the wind, as is the case with wipers used at the present time, which creates substantial and troublesome aerodynamic actions which give rise to a pressure beneath the wiper and a pressure drop above the wiper.

The invention will now be described with reference to the accompanying drawings which illustrate the conditions of working and show forms of embodiment of windscreen wipers in conformity with the invention, these forms being shown by way of examples and not in any sense of limitation.

Figure 2:
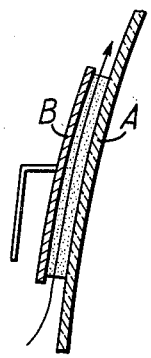
Figure 3:
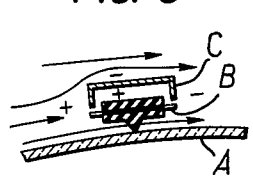
Figure 4:
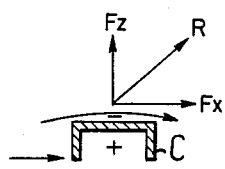
Figure 5:
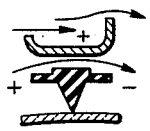
Figure 6:
Figure 7:
Figure 8:
Figure 9:
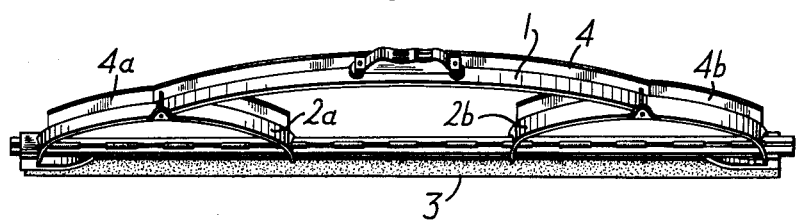

FIG. 1 shows diagrammatically the flow of streams of air along the windscreen of a vehicle;
FIG. 2 is a diagram of a standard windscreen wiper in a position parallel to the stream of air;
FIG. 3 is a cross-section of this same windscreen wiper, but in a position at right angles to the streams of air;
FIG. 4 illustrates the forces due to the tangential streams of air acting on the windscreen wiper-blade;
FIG. 5 is a diagrammatic cross-section of a windscreen wiper-blade in accordance with the invention;
FIG. 6 is a further diagrammatic cross-section of a windscreen wiper-blade in accordance with the invention;
FIG. 7 is another diagrammatic cross-section of a windscreen wiper-blade in accordance with the invention;
FIG. 8 is a further diagrammatic cross-section of a windscreen wiper-blade according to the invention;
FIG. 9 is a view in perspective of a windscreen wiper in accordance with the invention and corresponding to the wiper-blade of FIG. 6;
FIG. 10 is a diagrammatic cross-section of a wiper-blade with an inclined frame;
FIGS. 11 and 11a are respectively views in perspective with parts broken away, and in cross-section of a wiper-blade with an inclined frame in accordance with further embodiments;
FIG. 12 is a perspective view of a particular form of windscreen wiper in accordance with the invention;
FIG. 13 is a diagram showing the position taken up by an ordinary blade due to the effect of tangential wind at a high speed of the vehicle;
FIGS. 14 and 15 are views in cross-section of wiper-blades in accordance with the invention;
FIG. 16 is a plan view of a wiper-blade with an internal reinforcing flexor;
FIG. 17 is a cross-section taken along the line A—A of the windscreen wiper shown in FIG. 12.

There has been shown in FIG. 1 a perspective view of the front portion of a vehicle provided with a curved windscreen A, together with the direction of flow of the streams of air, the latter passing round the vehicle upwards and round the sides. In a zone in which a windscreen wiper B of the usual form is located parallel to the streams of air, as shown in FIG. 2, nothing unusual occurs; on the other hand, in a zone such as shown in FIG. 3, in which the streams of air are practically at right angles to the direction of the windscreen wiper, this air cannot flow along the glass because of the wiper-blade, and creates an increase in pressure (indicated by the sign +), which also exists in the region of the hollow profile comprised between the flanges of the frame C directed towards the windscreen. These flanges create further obstacles to the flow of air and assist in maintaining the increased pressure. In addition, the streams of air which pass round the wiper towards the upstream side tend, as is well known, to move away from the surface and to create a reduced pressure zone (indicated by the sign —). These two forces Fx and Fz (which can be compared with the drag and the lift acting on a wing section) have a resultant R which tends to lift the windscreen wiper against the mechanical pressure applied by the arm (see FIG. 4).

The invention is more particularly directed to means for correcting the intensity and the direction of application of the aerodynamic resultant, these means consisting mainly in the use of a profile such that it produces a pressure increase above and a pressure reduction below the wiper so as to press the blade against the windscreen.

Thus, use can be made with advantage of asymmetric U-profiles, the higher edge of which is located on the rear edge with respect to the flow of air, as shown in cross-section in FIG. 5, or again in the form of an L having one flange directed forwards and located on the rear edge with respect to the direction of flow of the streams of air (see FIG. 6), or also profiles such as those indicated in FIG. 7 with a slightly incurved nose on the edge opposite to that of the flange, or as in FIG. 8, having the profile of an aircraft wing, reversed and suitably directed.

Whatever form may be considered in accordance with these teachings, there is then created pressure increase on the upstream side (with respect to the direction of forward motion of the vehicle) by reason of the obstacle created by the frame to the streams of air flowing transversely along the windscreen.

On the other hand, the reversing of the profile with respect to the devices used at the present time has the advantage of considerably freeing the passage of air in the space between the blade and the frame and to set up a flow between the upstream side which has a pressure increase and the downstream side which has a reduced pressure as has been indicated in FIGS. 5, 6, 7 and 8. This freeing action of the profile is clearly shown in FIG. 9, which represents one form of embodiment of a windscreen wiper in accordance with the present invention, comprising a mounting frame, being formed of a main member 1 and two swingletrees 2a and 2b, supporting the blade 3. In accordance with the invention, the main member and the swingletrees are made from sections comprising flanges 4, 4a, 4b, directed towards the front, that is to say in the opposite direction to the blade. However, the main member 1 may alone have this feature, and the swingletrees may be formed of flat elements, or vice-versa.

In accordance with a further special feature in accordance with the invention, the frame of the blade is inclined, this frame being for example of the vane type 13, as has been previously described, so that its profile has an inclination α directed towards the side from which the tangential air-stream comes (arrow V) along the windscreen (see FIG. 10).

In this way, all the positive components Fz can be eliminated (see FIG. 4) and can be converted to negative components Fz which increase the force of application of the blade on the windscreen in the ratio of the square of the relative speed of the vehicle.

This inclination may be obtained in various ways:

(a) By twisting the arm 14 which is secured to a stirrup 15 carrying the blade, the value of the twist being distributed or not over the whole useful length of the blade-carrying arm, and being comprised between —5 and —10°.

(b) There may also be provided a forked member or stirrup 15 of asymmetrical form to connect the arm 14 to the frame 17, while giving it an inclination with respect to the plane of sliding on the windscreen (see FIGS. 11 and 11a).

In all cases, the blade will be fixed to the frame by means of clips, hooks, lugs or the like 18 and 18', of unequal heights on one side with respect to the other, in order to compensate for the inclination of the frame with respect to the upper face of the blade, or alternatively the latter may itself have a flanged upper face inclined in the same direction as the frame.

It is also an advantage to provide the frame with small transverse partitions 19, as shown in FIG. 12, these partitions having the effect of preventing the lateral sliding flow of the streams of air, and thus increasing the pressure above the profile.

The invention also provides for an improvement in the pressure of the blade of the wiper against the windscreen by modifying the profile of the blades of rubber themselves. The latter are generally provided with an elastic reinforcing flexor 20 parallel to the plane of sweep, on which flexor is fixed the articulated frame 21, for example by means of swingletrees (see FIG. 13).

In accordance with the arrangement generally adopted, the section of the blade has a thin web 22 in its plane of symmetry (see FIG. 13), which enables the blade to be held with a certain amount of play on the elastic flexor 20, and which forms a fictitious pivotal axis at every alternating movement of the blade on the windscreen. The inclination of the blade which results has the effect of offering an oblique surface to the relative air-flow due to the speed, and this has substantial aerodynamic effects on the blade itself and on the elastic flexor as a result of the streams of air passing over the edge 23 of this flexor at high speed, thus creating a pressure below and a pressure drop above the wiper.

In order to avoid these drawbacks, the invention provides blades having improved and widened sections which are shown in FIGS. 14 and 15.

In a first form, the flexor formed by a flexible blade 24 arranged parallel to the plane of wiping, is embedded in the body of the rubber wiper-blade 25 (see FIG. 14).

In a further form shown in FIG. 15, the flexor arranged externally has a width equal to or less than that of the profile of the wiper-blade, the web being thickened to the maximum extent and the assembly being effected very tightly.

In order to connect a wiper-blade of this kind to the frame, lugs 26 may be provided integral with the flexible flexor (see FIG. 16) and extending beyond the profile of the blade at both ends and on the sides so as to be engaged in small corresponding slides 27 fixed to the frame, for example to swingletrees 28 which form part of the said frame (see FIGS. 12 and 17).

Finally, in order to facilitate and to localise the deformation of the blade, grooves 29 may be provided in the blade web so as to form a hinge close to the wiping lip portion. There are thus obtained blades which do not tilt over during working, only the free extremity or wiping lip is inclined first in one direction and then the other during the course of operation.

It would of course be possible to envisage a large number of alternative forms of construction other than those shown, without thereby departing from the scope of the present invention.

What we claim is:

1. A windscreen wiper comprising a mounting frame and a wiper blade mounted on and spaced from said frame, said frame having an air foil cross section whereby the air-flow over the surface of said windscreen, having at least a component normal to the longitudinal axis of said frame, is directed between the frame and the wiper blade and over the mounting frame to create effectively a force directed toward said windscreen, thus applying pressure to the blade and preventing the blade from being lifted from the windscreen at high speeds of air-flow.

2. A windscreen wiper comprising a mounting frame and a wiper blade mounted on and spaced from said frame, said frame having an air foil cross section whereby the air-flow over the surface of said windscreen, having at least a component normal to the longitudinal axis of said frame, is directed between the frame and the wiper blade and over the mounting frame to create effectively a force directed toward said windscreen, thus applying pressure to the blade and preventing the blade from being lifted from the windscreen at high speeds of air-flow.

3. A windscreen wiper as in claim 1, in which at least a portion of the said frame has a cross-section in the form of a U, the legs of which are disposed in a direction substantially facing away from the windscreen.

4. A windscreen wiper as in claim 1, in which at least a portion of the said frame has a cross-section in the form of an asymmetrical U, the longer leg of which is located on the downstream end of said frame with respect to the flow of air.

5. A windscreen wiper as in claim 1, in which at least a portion of the said frame has a cross-section in the form of an L, the shorter leg of which is disposed in a direction substantially facing away from the windscreen, the longer leg of which is disposed toward the current of air flowing transversely over the windscreen.

6. A windscreen wiper as in claim 1, in which at least a portion of the said frame has a cross-section in the form of an inverted aircraft wing section and has a slight negative incidence to the said air-flow.

7. A windscreen wiper as in claim 1, and further comprising a plurality of small transverse partitions provided on the said frame, so as further to enhance the desired pressure.

8. A windscreen wiper comprising a wiper arm, a mounting frame and a wiper blade mounted on and spaced from said frame, said frame having an air foil cross section being given an inclination in a direction such that its edge facing the side from which the tangential flow of air arrives, is inclined toward the windscreen, whereby the air-flow over the surface of said windscreen, having at least a component normal to the longitudinal axis of said frame, is directed between the frame and the wiper blade and over the mounting frame to create effectively a force directed toward said windscreen, thus applying pressure to the blade and preventing the blade from being lifted from the windscreen at high speeds of air-flow.

9. A windscreen wiper as in claim 8, in which the said inclination of the frame is obtained by a permanent twist given to the said wiper arm.

10. A windscreen wiper as in claim 8, in which the said inclination of the frame is obtained by the use of an asymmetrical stirrup, the said stirrup coupling the wiper arm to the said frame.

11. A windscreen wiper comprising, a mounting frame and a wiper blade mounted on and spaced from said frame, said frame having an air foil cross-section configured to cause the air flow over the surface of said windscreen, having at least a component normal to the longitudinal axis of said frame, to be directed between the frame and the wiper blade and over the mounting frame to create effectively a force directed toward said windscreen, thereby to apply pressure to the blade and prevent the blade from being lifted from the windscreen at high relative speeds of air-flow, said wiper blade comprising a thin wiping lip portion extending longitudinally of said blade, a web portion extending from said wiping lip portion upwardly, said wiper blade having a bulbous upper part having a convex upper surface and having opposite sides gradually converging downwardly to said lip portion so that said lip portion has a relatively small height, and a flexor embedded in said bulbous upper part extending longitudinally thereof.

12. A windscreen wiper according to claim 11, in which said bulbous upper part is symmetrical relative to a longitudinal axis of symmetry and a vertical axis of symmetry.

13. A windscreen wiper according to claim 11, in which said flexor comprises lugs spaced axially thereon extending outwardly of said bulbous upper part and portions between said lugs completely embedded in said bulbous upper part and means to secure said lugs to said frame.

14. A windscreen wiper as in claim 1, said wiper blade comprising a small thin wiping lip portion, a web portion extending away from the wiping edge and having convex outer surface and a substantial width so that when the wiper blade is moved back and forth there is no bending of the wiper blade in the web portion and grooves in the wiper blade between the web portion and the wiping edge extending perpendicular to the height of the wiper blade and parallel to the wiping edge whereby during the course of operation the said wiper blade bends at said grooves.

References Cited in the file of this patent

UNITED STATES PATENTS

| | | |
|---|---|---|
| 2,543,383 | Scinta et al. | Feb. 27, 1951 |
| 2,548,090 | Anderson | Apr. 10, 1951 |
| 2,659,097 | Morton | Nov. 17, 1953 |
| 2,694,827 | Bacher | Nov. 23, 1954 |
| 2,706,291 | Rappl | Apr. 12, 1955 |
| 2,712,146 | Wise | July 5, 1955 |
| 2,741,791 | Scinta | Apr. 17, 1956 |
| 2,794,203 | Oishei | June 4, 1957 |
| 2,814,820 | Elliott et al. | Dec. 3, 1957 |
| 2,861,289 | Nesson | Nov. 25, 1958 |

FOREIGN PATENTS

| | | |
|---|---|---|
| 1,087,256 | France | Aug. 25, 1955 |